Dec. 26, 1944.   G. W. LANE   2,365,885
TENTERING CLIP CHAIN
Filed Oct. 21, 1943

INVENTOR,
George W. Lane,
BY John W. Steward
ATTORNEY.

Patented Dec. 26, 1944

2,365,885

UNITED STATES PATENT OFFICE 2,365,885

TENTERING CLIP CHAIN

George W. Lane, Clifton, N. J., assignor to Van Vlaanderen Machine Co., Paterson, N. J., a corporation of New Jersey Application October 21, 1943, Serial No. 507,078

5 Claims. (Cl. 74—257)

In a known type of cloth tentering machine there are two endless chains arranged side by side in the same horizontal plane and each extending around two wheels of which one is a sprocket wheel for driving the chain and each of which chains includes, as in effect links thereof, tentering clips, those clips which at any time are in the adjacent stretches of the two chains acting to grip the cloth and stretch it transversely. It has been proposed (Peterson Patent No. 1,907,090) to alternate with the clip-forming links of each chain other links, or links proper, which make it possible to extend the cloth-gripping reach of each clip-forming link, and it is to a chain of this particular type that my invention has been applied, as will appear. However, I do not wish to be limited accordingly.

The invention is concerned with provision for lubricating the link-connecting bearings of a chain (whether of a tentering machine or employed in fact for any other purpose) the axes of whose bearings are upright, and preferably also for lubricating the exterior sides of the links as in the case where, as in a tentering machine, such sides wipe the sides of the guideway in which a stretch of the chain travels from one to the other of the mentioned wheels. According to my invention and as per the example to be described a link of the chain, as a link proper, is formed in a novel way so as to be a container for liquid lubricant and provide for controlled flow of the lubricant to the chain bearings and also for flow of the lubricant to said sides of the link.

Figure 4:
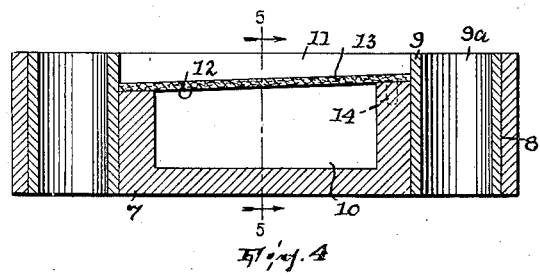
Fig. 4 is a longitudinal section thereof.
Figure 5:
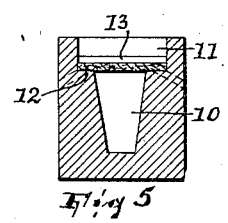

Fig. 5 a section on line 5—5, Fig. 4.

Figure 2:
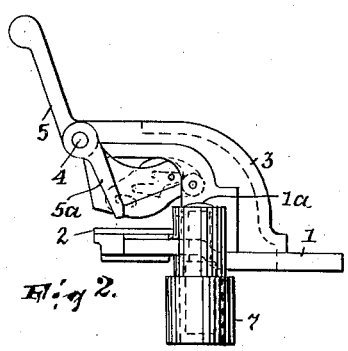
Fig. 2 is a side elevation of the assembled clip and link proper.

A tentering clip is shown of standard type, constructed in this example as follows: A base 1, providing at 2 the lower jaw of the clip, has an upstanding arm 3 which overhangs the jaw 2 and has pivoted therein on a pin 4 the lever 5 whose lower arm 5a forms a jaw to coact with jaw 2 to grip the cloth when, as an incident of the weight of arm 5a, the lever, in the travel of the chain (of which the clip exists as what I have termed a clip-forming link) is permitted to move clockwise in Fig. 2. In its travel from one to the other of the mentioned wheels the chain is engaged in the upwardly open groove of the guideway of the fixed structure of the machine, which guideway and its said groove are here shown at 6 and 6a, respectively. In the present case, as in the said Peterson patent, the chain is composed of the clip-forming links and links, alternating with them, which function only as such, and it is to the latter links that, according to the present example, I apply my invention. Thus:

7 is the body portion or body of one such link, being an elongated part, rectangular in cross-section, and having at each end thereof a socket 8 (here an actual hole penetrating it) penetrated by the corresponding (upright) bearing axis of the link, and porous means in the socket, as a bushing 9 permeable by liquid lubricant and having its bearing bore 9a concentric with said axis and adapted to receive the stud or equivalent bearing, as 1a, of the adjoining clip-forming link. Between the sockets a sink or well is formed in the body. This includes a sink or well proper 10 extending short of each bushing and a countersink 11, the countersink providing around the well a ledge 12 which is inclined toward one end of the link. The well proper is desirably covered by a removable strip 13 of felt or other porous material which rests on the ledge 12. And preferably there are lubricant ports 14 inclined downwardly from the ledge to the exterior side surfaces of the body, being here located at the higher end of the ledge. Preferably the long sides of the well proper are inclined from the vertical upwardly to the ledge.

Figure 1:
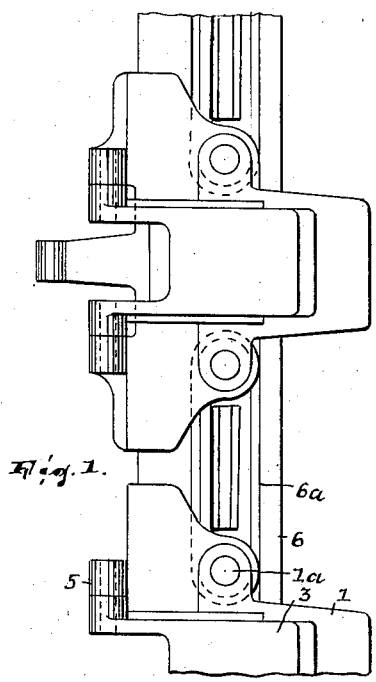
Fig. 1 is a plan of a portion of a tentering machine chain embodying my improvement, together with a fragment of the guideway.
Figure 3:
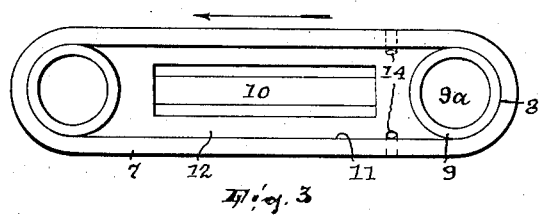
Fig. 3 is an enlarged plan of the link proper.

Liquid lubricant is to be placed in the well when the link is operating as a part of the chain. It may be of such depth as to cover the ledge, in which case it would be free to penetrate the bushings to reach their bores. But when the movements of the link as a part of the chain are considered it will usually suffice if the lubricant level is entirely below the ledge, since sidewise and other irregular movements of the link (for instance, incident to its travel around one of the mentioned wheels) will cause the lubricant to be displaced upwardly onto the inclined ledge, in which case it flows down the same to the one bushing and (the direction of travel being as per the arrow in Fig. 3), due its inertia on sudden forward movements of the link, it is also caused at times to flow up the ledge to reach the other bushing. The link body is of course substantially non-porous or impermeable by the lubricant so that the latter escapes from the well proper only when it is deposited on the ledge, and it is thus conserved and over-lubrication is avoided.

So much of the lubricant as reaches and passes down through a port 14 serves to lubricate the exterior sides of the link and hence the groove 6a.

Having thus fully described my invention, what I claim is:

1. A chain link having its pivoting axes upright, said link comprising a link body having a socket penetrated by one such axis and porous means in the socket permeable by liquid lubricant and having a bearing bore concentric with one such axis and to receive the bearing of that chain-component which is next to adjoin said link, said body having a lubricant well which at least as to its uppermost portion is partitioned off from said bore only by said means.

2. The combination set forth in claim 1 characterized by the well below said portion being partitioned off from said bore by a portion of said body substantially impermeable by the lubricant.

3. A chain link having its pivoting axes upright, said link comprising a link body substantially impermeable by liquid lubricant and having a socket penetrated by one such axis and porous means in the socket permeable by said lubricant and having a bearing bore concentric with one such axis and adapted to receive the bearing of that chain-component which is next to adjoin the link, said body having a lubricant well which, below a plane cutting said body and said axes transversely of the latter and which is inclined downwardly toward said socket, is partitioned off from the bore by a wall of said body and, above said plane, only by said means, said well being formed in cross-section to define a ledge coincident with said plane and extending to said porous means.

4. A chain link having its pivoting axes upright, said link comprising a link body substantially impermeable by liquid lubricant and having sockets respectively penetrated by said axes and porous means in the respective sockets permeable by said lubricant and having bearing bores concentric with the respective axes and adapted respectively to receive the bearings of those chain-components which next adjoin the link, said link body having a lubricant well which, below a plane cutting said body and said axes transversely of the latter and which is inclined from one to the other socket, is partitioned off from the bores by walls of said body and, above said plane, only by the said respective means, said well being formed in cross-section to define a ledge coincident with said plane and extending from one to the other of said means.

5. The combination set forth in claim 1 characterized by the well below its said portion being partitioned off from said bore by a portion of said body substantially impermeable by the lubricant and by said body having a port leading from said portion of the well to the exterior side surface of said body.

GEORGE W. LANE.